(12) United States Patent
Davis (10) Patent No.: US 7,924,371 B1
(45) Date of Patent: Apr. 12, 2011

(54) MULTIMODE DISPLAY FOR NVIS COMPATIBLE OPERATION

(75) Inventor: Joshua V. Davis, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 159 days.

(21) Appl. No.: 12/231,221

(22) Filed: Aug. 29, 2008

(51) Int. Cl.
*G02F 1/1335* (2006.01)
(52) U.S. Cl. .............................. 349/68; 349/64; 349/61
(58) Field of Classification Search .................. 349/61, 349/64, 68
See application file for complete search history.

(56) References Cited

U.S. PATENT DOCUMENTS

| | | | | |
|---|---|---|---|---|
| 6,419,372 | B1 * | 7/2002 | Shaw et al. ................... | 362/231 |
| 6,789,921 | B1 * | 9/2004 | Deloy et al. .................. | 362/97.3 |
| 7,025,474 | B2 * | 4/2006 | Campbell et al. ............. | 362/231 |
| 7,481,954 | B2 * | 1/2009 | Warren et al. ................. | 252/582 |
| 7,674,000 | B2 * | 3/2010 | Valerio et al. ................ | 362/97.3 |
| 7,766,529 | B2 * | 8/2010 | Hadlich et al. ................ | 362/612 |
| 2002/0158823 | A1 * | 10/2002 | Zavracky et al. .............. | 345/87 |
| 2003/0123705 | A1 * | 7/2003 | Stam et al. .................... | 382/104 |
| 2004/0179283 | A1 * | 9/2004 | Jones et al. ................... | 359/885 |
| 2004/0181006 | A1 * | 9/2004 | Warren et al. ................. | 524/556 |
| 2005/0094391 | A1 * | 5/2005 | Campbell et al. ............. | 362/231 |
| 2009/0010494 | A1 * | 1/2009 | Bechtel et al. ................ | 382/104 |
| 2009/0154194 | A1 * | 6/2009 | Hadlich et al. ................ | 362/612 |
| 2009/0225531 | A1 * | 9/2009 | Praiswater .................... | 362/97.2 |

* cited by examiner

*Primary Examiner* — K. Cyrus Kianni
(74) *Attorney, Agent, or Firm* — Matthew J. Evans; Daniel M. Barbieri (57) ABSTRACT

A multimode display for night vision imaging system (NVIS) compatible operation including a display assembly including a display subassembly having a display component; and, a backlight printed wiring board (PWB) assembly positioned behind the display subassembly. The backlight printed wiring board (PWB) assembly includes a printed wiring board (PWB). A top side mounted LED array is mounted on a first side of the printed wiring board (PWB) including a top side plurality of LEDs including a top side set of white LEDs. A reverse-mounted LED array is mounted on a second side of the printed wiring board (PWB) including a reverse-mounted plurality of LEDs including a reverse-mounted set of white LEDs. A dedicated primary IR filtering means is operatively associated with the reverse-mounted LED array for conditioning light emitted from the reverse-mounted LED array for NVIS compatible operation. In a day mode of operation the forward-side mounted LED array illuminates the display subassembly. In an NVIS mode of operation filtered light from the reverse-mounted LED array illuminates the display subassembly.

30 Claims, 9 Drawing Sheets

MULTIMODE DISPLAY FOR NVIS COMPATIBLE OPERATION

BACKGROUND OF THE INVENTION

1. Field of the Invention

The present invention relates generally to the field of liquid crystal displays including an LED (Light Emitting Diode) backlight. More particularly, the application relates to a liquid crystal display including a multimode LED backlight that is compatible with night vision imaging system (NVIS) requirements.

2. Description of the Related Art

Single mode NVIS (Night Vision Imaging System) compatible backlights are reliant on expensive and complex IR (Infra-red) filters with requisite engineered high optical transmission.

Material and labor associated with IR filtering solutions remain a top cost driver for avionics grade military AMLCD (Active Matrix Liquid Crystal Display) products. Most single mode military display designs utilize IR filtering via a fairly complex glass component with multiple thin film treatments or a laminated assembly of coated and/or absorptive filters. Further driving the cost and complexity (and value) of these filters is the need for high optical transmission in order to avoid generating higher secondary costs and complexity in the traditional single mode backlight (more power results in more LEDs).

Many previous dual mode backlights experienced complexity and cost creep which negated their basic virtues of day mode power reduction and large filter component cost reduction. Often, prior dual modes required custom waveguides and expensive fab parts to host and mount complex assemblies. Traditional dual mode backlights also had producibility issues in several areas as well. Multiple application, cleaning and cure cycles and the resultant labor associated with the use of adhesives used to prevent light leaks around the filters proved to be challenging and generated painfully long durations for work in process. Many prior dual modes used the same expensive NVIS filter components (just smaller, higher count) as their single mode backlight assembly counterparts, negating potential cost savings and resulting in the same limited supply source issues. In addition to high component material cost from the filters, the use of multiple PWBs (Printed Wiring Boards) and resultant needed interconnect also drove related material and labor costs higher. The complexity and cost of these prior dual mode backlight architectures has limited the ability to respond to increasing cost, producibility and performance pressures.

Cost reduction efforts for the current large multi-film IR filters have been fairly successful, reducing filter costs by as much as 60-70%. Yet these traditional NVIS filters remain as one of the highest cost reduction opportunities in existing display products for military applications.

Further significant cost reductions from traditional suppliers, however, seem unlikely. Cost creep upward may be a more likely scenario.

U.S. Pat. No. 6,419,372, entitled "Compact Optical Wave-Guide System for LED Backlighting Liquid Crystal Displays," issued to J. E. Shaw et al., discloses a flat panel display and a backlight which provides both night vision and day mode backlighting of the flat panel display. The backlight of the flat panel display includes a circuit card and day mode light emitting diodes (LEDs) positioned coplanar with each other on the circuit card. Night Vision (NVIS) LEDs are positioned on the circuit card coplanar with the day mode LEDs. An optical wave-guide is positioned in front of the day mode LEDs and the NVIS LEDs and is adapted to distribute light from the day mode LEDs and from the NVIS LEDs forward away from the LEDs and the circuit card.

U.S. Pat. No. 6,789,921, entitled "Method and Apparatus for Backlighting a Dual Mode Liquid Crystal Display," issued to C. T. Deloy et al., discloses an LED backlight system for dual mode operation with an NVIS system which utilizes non-edge lit night mode LED and a thermal conduction path from the day mode array of LEDS to a rearward disposed heat sink which cross the night mode array of LEDS. The system includes first and second LED arrays, the second array being located behind the first array. Light from the second LED array pass through a plurality of apertures located on the circuit card supporting the first array.

U.S. Pat. No. 6,842,204, entitled "Color Display System For NVIS Class A Compatibility," issued to R. J. Johnson, discloses a full color liquid crystal display system providing compatibility with Class A night vision imaging goggles. One embodiment of the invention is directed to a color liquid crystal display (LCD) having dual modes of operation. The color LCD display includes a normal mode light source, a liquid crystal display stack positioned so as to receive light from the normal mode light source, and a night vision imaging system (NVIS) mode light source. The NVIS mode light source includes a NVIS mode white light source, a NVIS mode red light source, a NVIS filter receiving light from both the NVIS mode white light source and the NVIS mode red light source, and a waveguide receiving light from the NVIS filter for reflection to the LCD stack.

The introduction of LEDs as a practical light source for avionics backlighting has created novel opportunities to address classic NVIS filtering challenges and performance compromises that were present in traditional single mode backlights. The present invention, as disclosed below, represents a synthesized solution to these challenges.

SUMMARY OF THE INVENTION

In a broad aspect, the present invention is a multimode display for night vision imaging system (NVIS) compatible operation including a display assembly including a display subassembly having a display component; and, a backlight printed wiring board (PWB) assembly positioned behind the display subassembly. The backlight printed wiring board (PWB) assembly includes a printed wiring board (PWB). A top side mounted LED array is mounted on a first side of the printed wiring board (PWB) including a top side plurality of LEDs including a top side set of white LEDs. A reverse-mounted LED array is mounted on a second side of the printed wiring board (PWB) including a reverse-mounted plurality of LEDs including a reverse-mounted set of white LEDs. A dedicated primary IR filtering means is operatively associated with the reverse-mounted LED array for conditioning light emitted from the reverse-mounted LED array for NVIS compatible operation. In a day mode of operation the forward-side mounted LED array illuminates the display subassembly. In an NVIS mode of operation filtered light from the reverse-mounted LED array illuminates the display subassembly.

The present invention has inherent advantages over other approaches in that a natural low cost, low complexity packaging platform is provided in the form of the single host backlight PWB. Since the night mode array is positioned in a different plane from the day mode, several convenient low cost filter packaging approaches may be used. A thin die cut sheet of dye based IR filter material may be used over the NVIS mode array (clearance apertures cut for day mode LEDs). Individual NVIS wafers may be laser cut from dye based material sheets and either surface mounted with PSA (Pressure Sensitive Adhesive) over reverse mount LED aperture holes or flush mounted in the reverse mount aperture holes and held captive with the backlight reflector film.

DETAILED DESCRIPTION OF THE INVENTION

Figure 1:
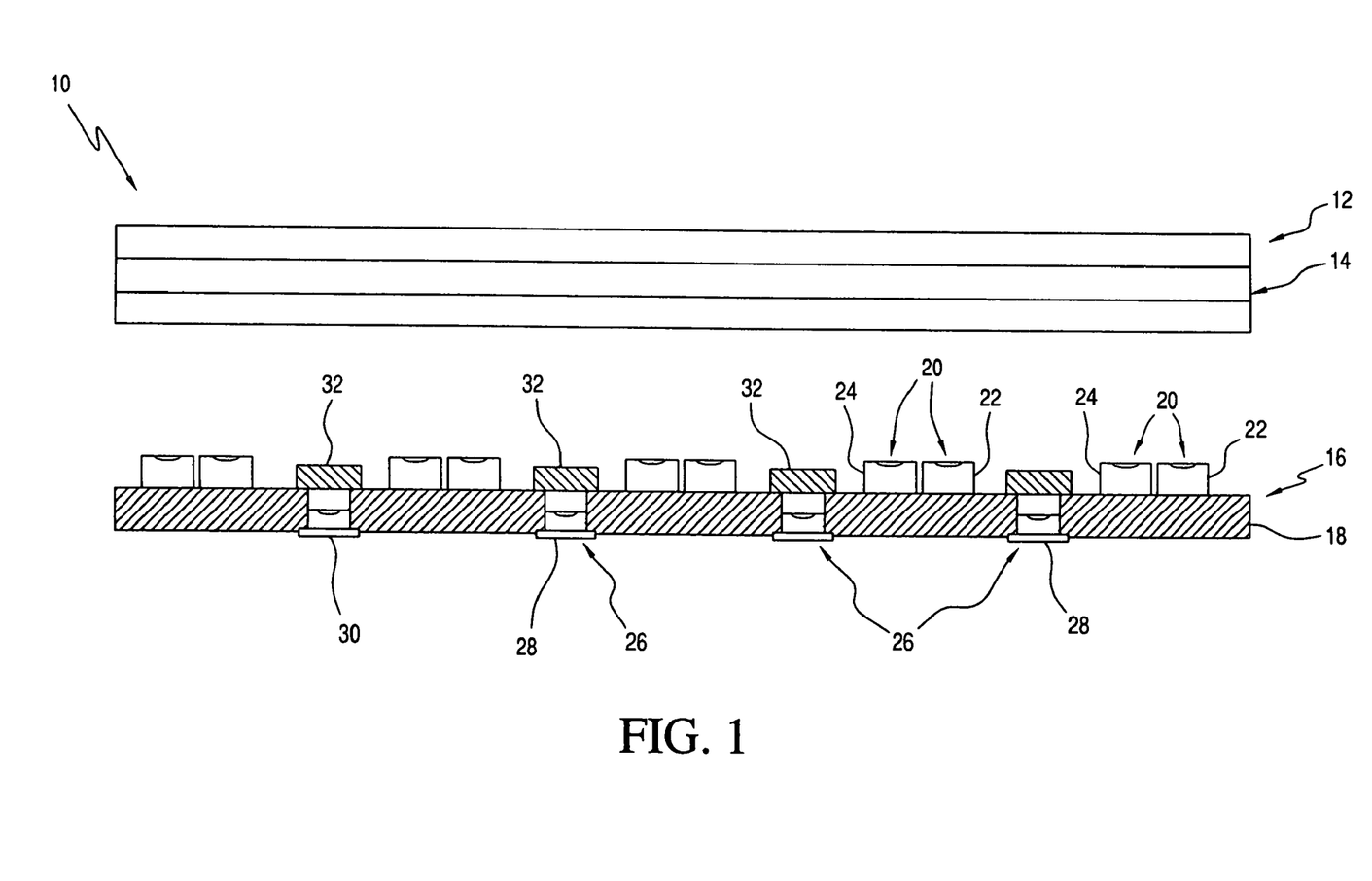
FIG. 1 is a simplified cross sectional illustration of a first embodiment of the multimode display of the present invention in which individual primary NVIS filters are mounted over either individual LEDs or groups of LEDs.

Referring now to the drawings and the characters of reference marked thereon, FIG. 1 is a simplified cross sectional illustration of a first embodiment of the multimode display of the present invention, designated generally as 10, with some features not shown for the purposes of clarity. The multimode display 10 includes a display assembly 12 including a display subassembly 14; and, a backlight printed wiring board (PWB) assembly 16 positioned behind the display assembly 12. The display subassembly 14 typically includes a liquid crystal display (LCD) stack. An AMLCD (Active Matrix Liquid Crystal Display) stack is preferably used. The display subassembly 14 further preferably includes polarizers, compensators, optical enhancement films, coverglass, and/or heater assemblies (as necessary per the environment and performance requirements).

The backlight PWB assembly 16 includes a printed wiring board (PWB) 18. A top side mounted LED array 20 is mounted on a first (top) side of the printed wiring board (PWB) 18. The array 20, may include, for example, a top side plurality of LEDs including a top side set of white LEDs 22 and red LEDs 24. In a broad aspect, it may include only white LED's where cost and simplicity are more important than extended color space performance. Light sources other than LED's may be used but those options have performance limitations that are not cost effective when compared as a system. Preferably, additionally, top side mounted green and blue LEDs may also be used for optimal performance.

A reverse-mounted LED array 26 is mounted on a second (bottom) side of the printed wiring board (PWB). Array 26 includes a reverse-mounted plurality of LEDs including a reverse-mounted set of white LEDs 28 and preferably red LEDs 30.

Dedicated primary IR filtering means is operatively associated with the reverse-mounted LED array for conditioning light emitted from the reverse-mounted LED array for NVIS compatible operation. The primary IR filtering means shown in FIG. 1 includes a plurality of primary NVIS filters 32, each mounted on the top of an opening associated with one of the reverse-mounted LEDs 26. As used herein the term "dedicated" refers to the fact that the primary filters functionally filter only the reverse-mounted LEDs 26 and do not provide filtering collectively to all lighting elements (including top mount LED array 20) as would a traditional single mode filter, or a secondary filter or hot mirror placed between display subassembly 14 and printed wiring board assembly 16. The dedicated primary IR filtering means may be of a single specification and may be used on both the set of white LEDs 28 and the set of red LEDs 30. This approach allows for either physically separate filters for each individual LED or larger single filters which cover closely oriented and co-located elements of white LEDs 28 and red LEDs 30 of various number and combinations. The shared filters for LEDs may be in the form of wafers or strips of various shapes optimal for LED group patterns being covered. Packaging approaches shown in FIGS. 1, 2, and 3 all apply to this general approach of a single filter specification. Shared coverage of LEDs by single filters are possible in configurations represented by FIGS. 1 and 3.

In a day mode of operation the forward-side mounted LED array 20 illuminates the display subassembly 14; and, in an NVIS mode of operation filtered light from the reverse-mounted LED array 26 illuminates the display subassembly 14.

Each primary NVIS filter 32 may be a dye based filter or a coated filter hosted on plastic, lending itself to low cost fabrication methods. These primary filters may alternatively be traditional multicoated glass filters if performance or application particulars warrant such use. The filters 32 act as a means of conditioning the light emitting from the LEDs 28, 30. The radiance levels produced by such filters 32 alone can yield results acceptable for most applications. This has been made possible by significant increases in white LED efficiencies over time and resultant reductions in phosphor area available for phosphorescing within the luminaire. As will be shown below in detail, for added infra-red radiance suppression, a hot mirror or low cost secondary NVIS filter may be used in addition to the primary filtering means to supplement IR filtering performance. The primary function of the secondary filter is to reduce the effects of the day mode LED phosphorescing which occurs when the NVIS mode is activated.

Figure 2:
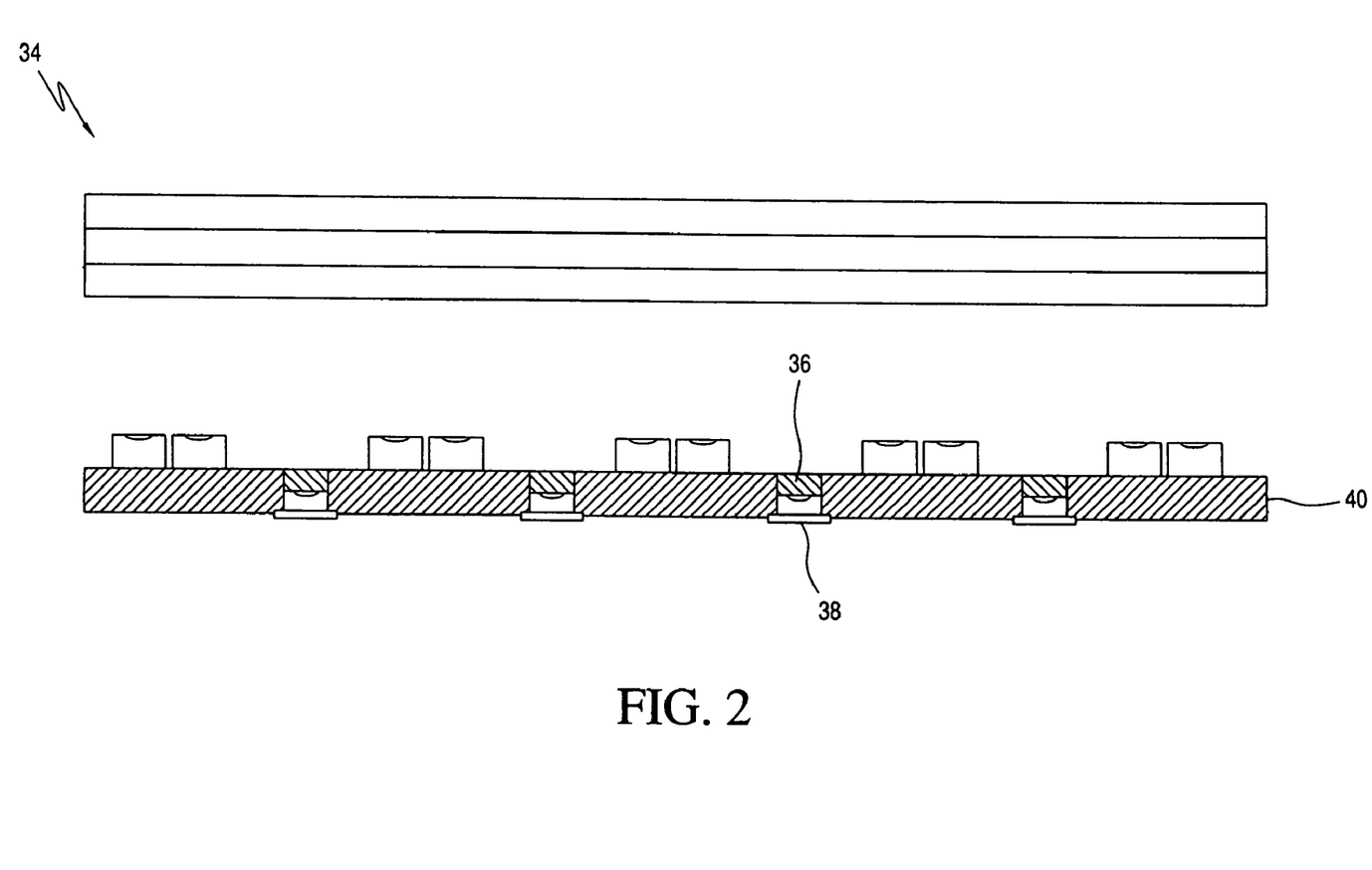
FIG. 2 is a simplified cross sectional illustration of a second embodiment of the multimode display in which the primary NVIS filters are each mounted in the reverse mount LED aperture on top of an associated one of the reverse-mounted LEDs.

Referring now to FIG. 2, a second embodiment of the multimode display of the present invention is illustrated, designated generally as 34. In this embodiment the dedicated primary IR filtering means comprises a plurality of primary NVIS filters 36, each mounted on top of an associated one of the reverse-mounted LEDs 38 in an opening of the PWB 40. This configuration could potentially leverage the automated placement of modern pick and place machines as disc shaped filters could be easily converted into tape and reel components. Once the filters are "dropped" into the holes over the LEDs 38, the perimeter of the hole would prevent shifting of the filters. This approach would also yield a higher economy of filter material. It may not be economical to automate and use this approach on very low volume programs. This embodiment also creates a more efficient luminaire than the approach shown in FIG. 1 as the area of exposed dark filter material decreases relative to the amount of high quality reflector area present in the application. Not shown is a reflector film that could be used as a retention feature for the primary filters once they have been placed in the reverse-mount LED apertures. Other means of securing filters could include automated application of optically clear liquid adhesive to the top of the LED prior to pick and place of reeled filter material parts.

Figure 3:
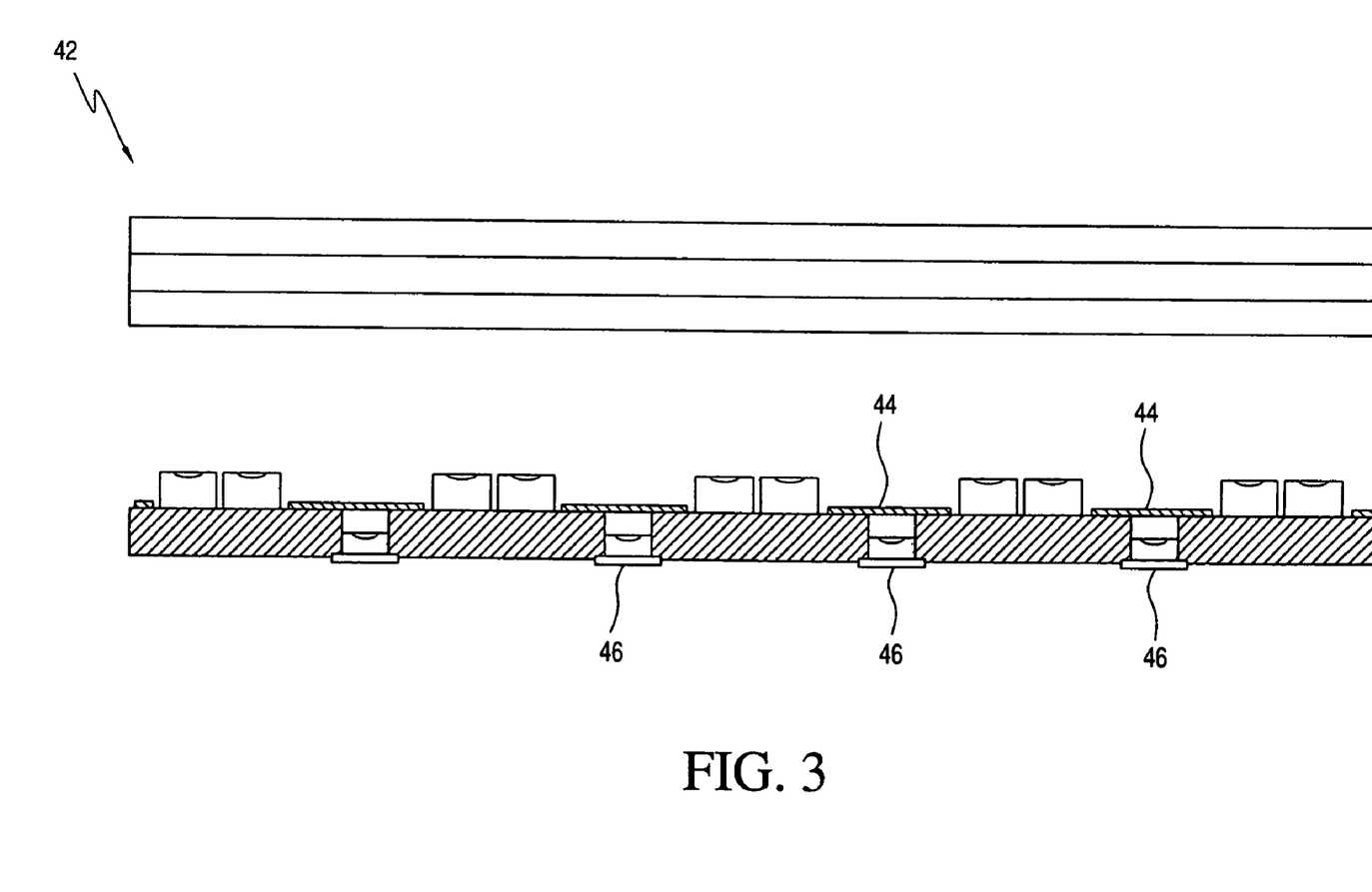
FIG. 3 is a simplified cross sectional illustration of a third embodiment of the multimode display which utilizes a primary NVIS filter sheet which nests around the day mode LEDs and over the reverse mount LED apertures.

Referring now to FIG. 3, a third embodiment of the multimode display of the present invention is illustrated, designated generally as 42. In this embodiment the dedicated primary IR filtering means comprises a primary NVIS filter sheet 44 mounted on top of the reverse-mounted plurality of LEDs 46. This embodiment would be an attractive option if the material cost is low enough to erode the advantages of optimizing use of material. This option is inherently easier to assemble.

Referring again now to FIG. 1, although the dedicated primary filtering means associated with the reverse-mounted LED array 26 was discussed above as being of a single specification such means may alternatively be of two distinct specifications: one optimally specified for the white LEDs 28; and, one optimally specified for the red LEDs 30. In this approach LEDs of each color would be covered and functionally filtered by a corresponding filter specified for optimal performance for that particular LED's spectral output. This approach could be accommodated by the generalized approaches shown in FIGS. 1, 2, and 3. In a backlight featuring both white and red reverse-mounted LEDs, the general approach shown in FIG. 3 would feature two stacked filter films or sheets with cutouts selectively located so each respective LED from array 46 is filtered through only the layer of filter material optimally matched to its spectral output. Additionally, as with single filter specification approaches, this approach could also utilize larger filters to cover tightly clustered groups of like colored LEDs.

Figure 4:
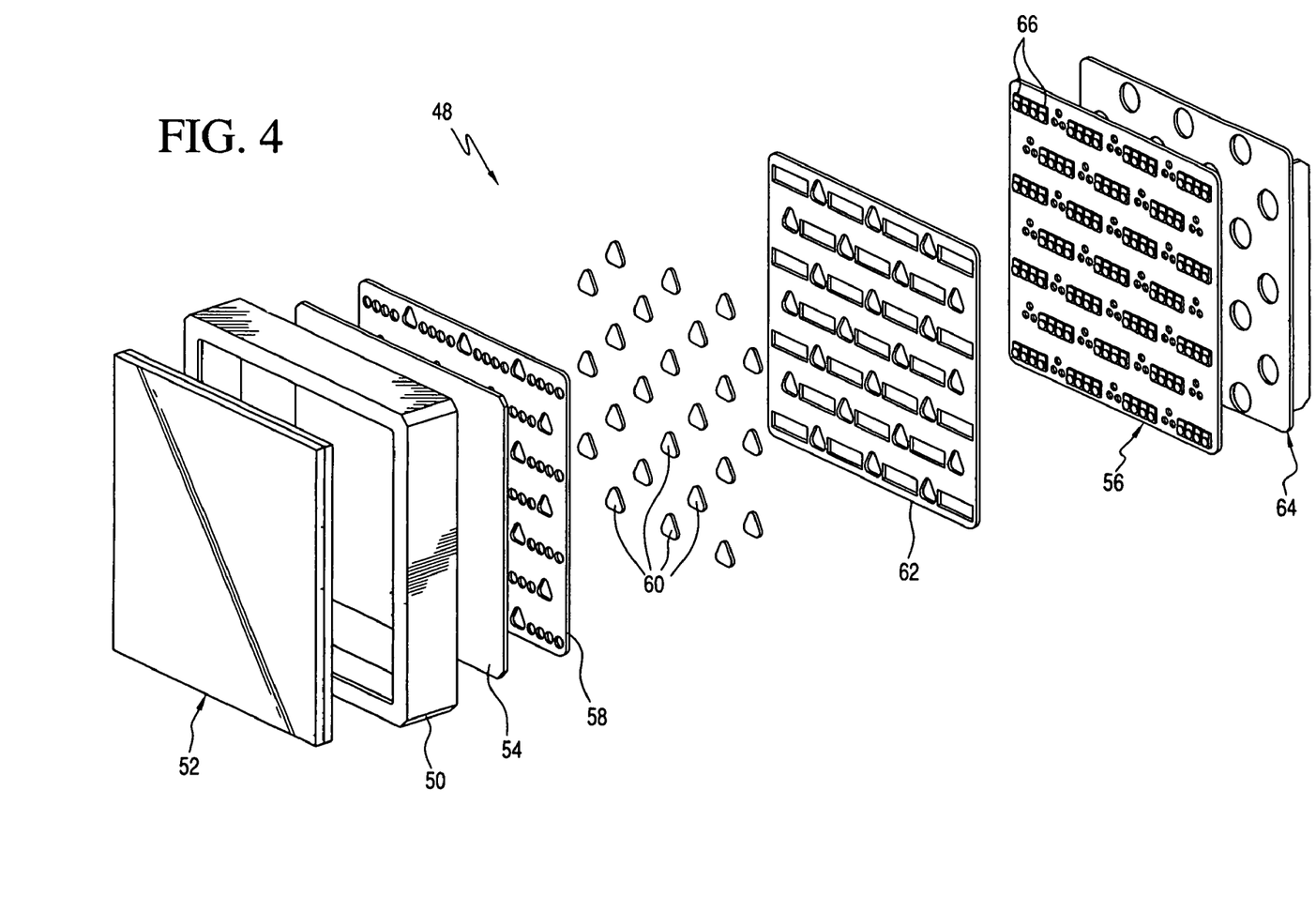
FIG. 4 is an exploded view of a preferred embodiment of the multimode display of the present invention (in this case, expanded from the FIG. 1 concept).
Figure 5:
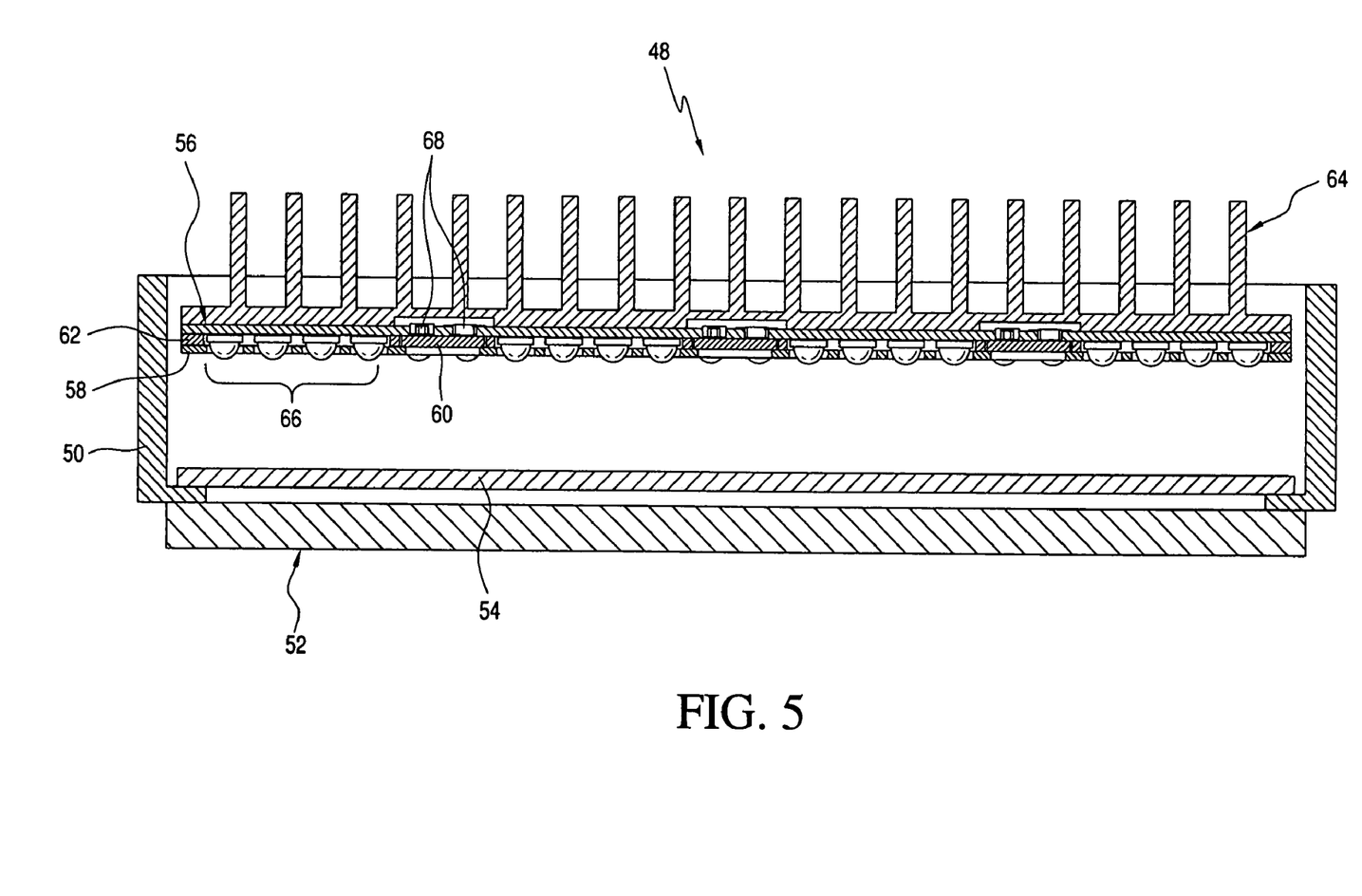
FIG. 5 is a cross sectional view of the multimode display of FIG. 4.

Referring now to FIGS. 4 and 5, a preferred embodiment of the multimode display of the present invention is illustrated, designated generally as 48, as shown implemented in hardware. The display assembly of this embodiment includes a display frame chassis 50 serving as a spacing and supporting element for the display subassembly 52. A secondary IR filter 54 is positioned between the backlight printed wiring board (PWB) assembly 56 and the display subassembly 52. As noted above, the positioning and use of filter 54 reduces the effects of the day mode LED phosphorescing which occurs when the NVIS mode is activated. The secondary IR filter 54 may typically comprise a single optical coating hosted on a plastic or glass substrate. Additional performance could be obtained by additional coating layers, or potentially, a high transmission absorptive host material.

A backlight reflector 58 is positioned between the PWB assembly 56 and the display subassembly 52 to recycle light and to potentially serve as a retention feature for the primary NVIS filters 60. The dedicated primary IR filtering means includes a foam NVIS filter light leak gasket 62 with openings into which the primary filters 60 are nested into position over the reverse mounted LEDs 68. A backlight heatsink 64 is operatively positioned relative to the PWB assembly 56 to dissipate heat therefrom.

Figure 6:
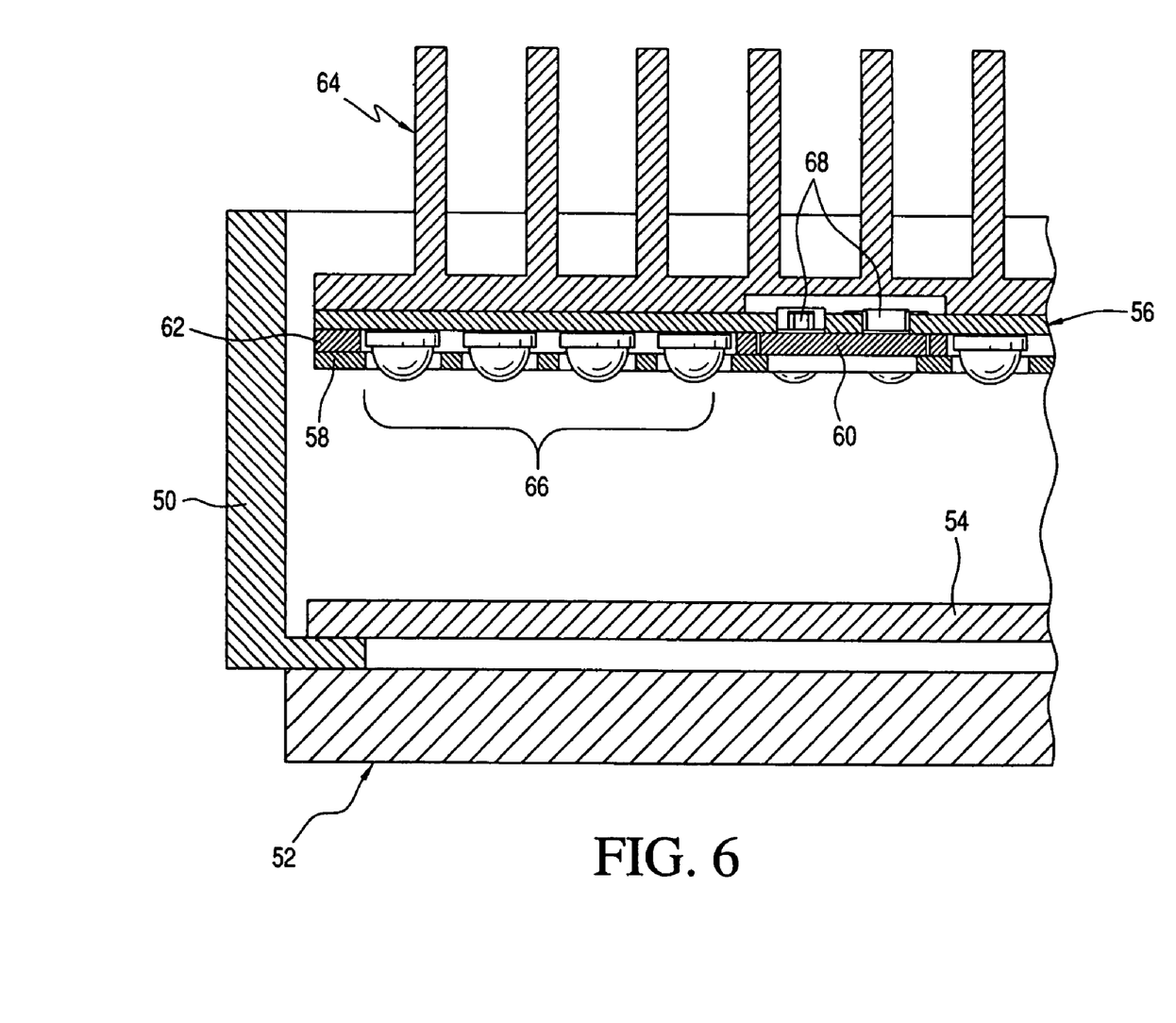
FIG. 6 is an enlarged view of a portion of the cross sectional view of FIG. 5 to emphasize the placement of the LEDs.

As can be seen most clearly in FIG. 6, the multimode display 48 preferably utilizes sets 66 of four top side LEDs—red, green, blue, and white; and, sets 68 of two reverse-mounted LEDs—red and white. These groups of four are shown co-located for the sake of simplicity of presentation and discussion, and would ideally be more interspersed for enhanced uniformity.

Figure 7:
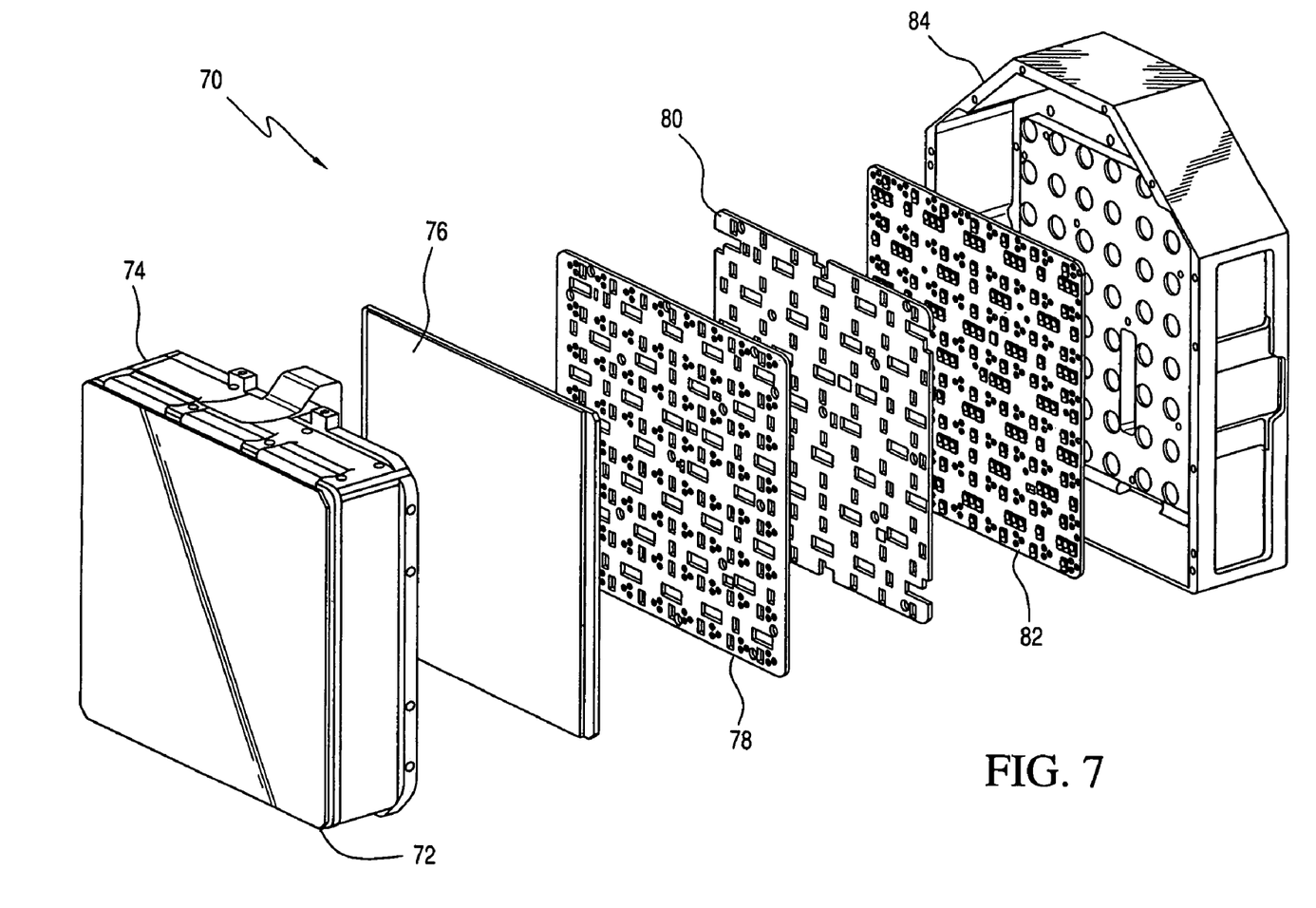
FIG. 7 is an exploded view of a preferred embodiment of the multimode display of the present invention (in this case, expanded from the FIG. 3 concept).

Referring now to FIG. 7, a preferred embodiment of the multimode display shown previously in FIG. 3 is illustrated, designated generally as 70, as shown implemented in hardware. The display assembly of this embodiment includes a display frame chassis 74 serving as a spacing and supporting element for the display subassembly 72. A secondary IR filter assembly 76 is positioned between the backlight printed wiring board assembly 82 and the display subassembly 72. As noted previously, the positioning and use of secondary filter 76 reduces the effects of the day mode LED phosphorescing which occurs when the NVIS mode is activated.

Figure 8:
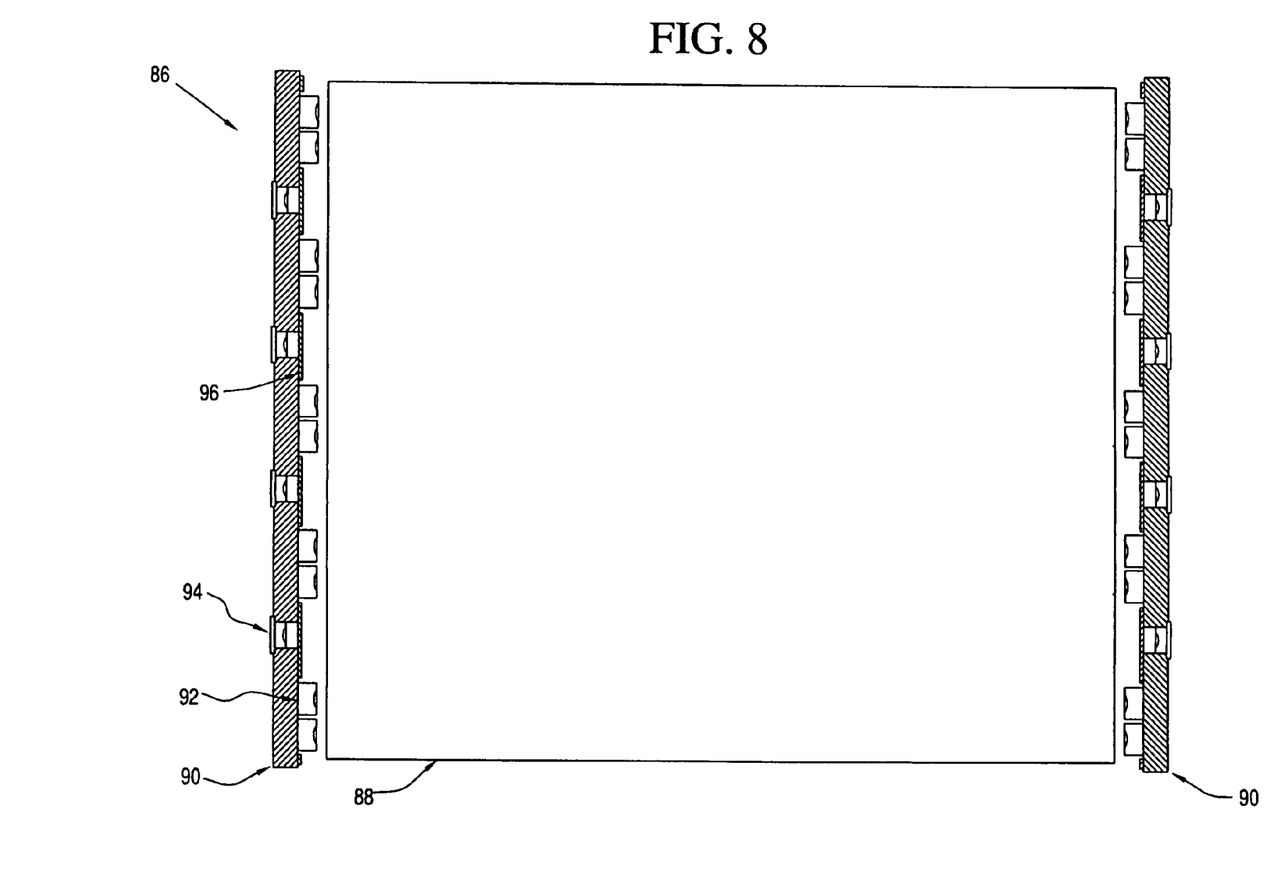
FIG. 8 is a front view of a multimode display embodiment utilizing an edgelit backlight waveguide.

Referring now to FIG. 8, an alternate embodiment of the multimode display of the present invention is illustrated, designated generally as 86. In this embodiment one or more LED printed wiring board assemblies 90 transmit light into a backlight waveguide 88 which in turn redirects uniform light forward to the display subassembly (designated as 98 in FIG. 9). As with prior embodiments, a printed wiring board assembly including a plurality of top mounted LEDs 92 and a plurality of reverse mounted LEDs 94 provides two modes of backlight operation. The top mounted LEDs 92 provide high luminance, unfiltered light for day mode operation and the reverse mounted LEDs 94 provide lower luminance filtered light through a dedicated primary filtering means of the general variety disclosed in any of FIG. 1, 2, or 3 and the related detailed descriptions of those embodiments. The waveguide 88 shown in FIG. 8 is shown to receive light from two printed wiring board assemblies, positioned on opposite ends of the waveguide. However, depending on waveguide configuration, as few as one and as many as four backlight printed wiring boards could be utilized. For the sake of clarity, only the primary filtering means depicted and subsequently described from the basic concept shown previously in FIG. 3 has been represented in FIGS. 8 and 9. Derivatives of the primary filtering schemes used in embodiments of FIGS. 1 and 2 could be used as well with the general embodiment 86.

Figure 9:
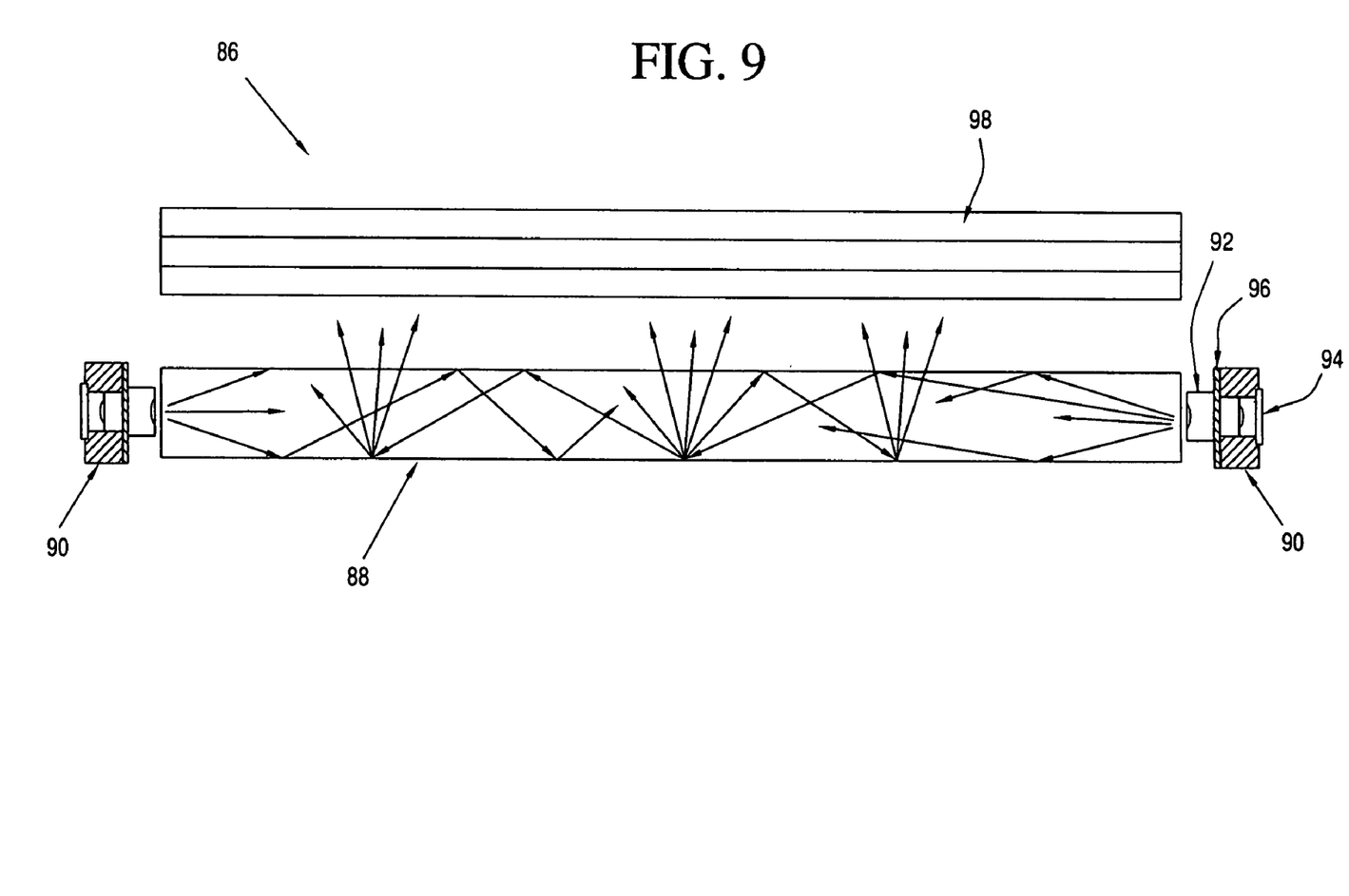
FIG. 9 is a top view of embodiment of FIG. 8, showing light being received into the backlight waveguide from the printed wiring board assemblies and emitted forward to the display subassembly.

FIG. 9 shows a top view of the same embodiment of FIG. 8. Light is transmitted from either the top mounted LEDs 92 of the day mode or from the reverse mount LEDs 94 of the night or NVIS mode of operation as provided through the dedicated primary filtering means 96 into the backlight waveguide 88. The waveguide is of a typical construction and serves only as a transmission device to uniformly redirect light from either mode of the backlight forward to the display subassembly 98. Light is transmitted into the waveguide where the physics of internal reflection serves as a means of scrambling the light in a uniform manner prior to redirecting the light forward. As with typical backlight waveguide construction, an etched or painted pattern on the backside (away from the display subassembly 98) of the waveguide 88 ejects the light forward. Variation in thickness or shape of the waveguide 88 along with adjoining optical films may also be used as a means to project the light forward to the display subassembly 98 in a uniform fashion.

Other embodiments and configurations may be devised without departing from the spirit of the invention and the scope of the appended claims.

The invention claimed is:

1. A multimode display for night vision imaging system (NVIS) compatible operation, comprising:
 a) a display assembly including a display subassembly, said display subassembly comprising a display component;

b) a backlight printed wiring board (PWB) assembly positioned behind said display subassembly, comprising,
  i) a printed wiring board (PWB);
  ii) a top side mounted LED array mounted on a first side of said printed wiring board (PWB) comprising a top side plurality of LEDs including a top side set of white LEDs;
  iii) a reverse-mounted LED array mounted on a second side of said printed wiring board (PWB) comprising a reverse-mounted plurality of LEDs including a reverse-mounted set of white LEDs; and,
  iv) dedicated primary IR filtering means operatively associated with said reverse-mounted LED array for conditioning light emitted from said reverse-mounted LED array for NVIS compatible operation; and
c) a secondary IR filter positioned between said backlight printed wiring board (PWB) and said display subassembly,
wherein in a day mode of operation said forward-side mounted LED array illuminates said display subassembly; and, in an NVIS mode of operation filtered light from said reverse-mounted LED array illuminates said display subassembly.

2. The multimode display of claim 1 wherein said top side plurality of LEDs further includes a top side set of red LEDs.

3. The multimode display of claim 1 wherein said reverse-mounted plurality of LEDs further includes a reverse-mounted set of red LEDs.

4. The multimode display of claim 1 wherein said top side plurality of LEDs further includes a top side set of green LEDs.

5. The multimode display of claim 1 wherein said top side plurality of LEDs further includes a top side set of blue LEDs.

6. The multimode display of claim 1 wherein said dedicated primary IR filtering means comprises a plurality of primary NVIS filters, each mounted on the top of an opening for one or more of said reverse-mounted LEDs.

7. The multimode display of claim 1 wherein said dedicated primary IR filtering means comprises a plurality of primary NVIS filters, each mounted in an opening directly on top of an associated one of said reverse-mounted LEDs in an opening of said PWB.

8. The multimode display of claim 1 wherein said dedicated primary IR filtering means comprises a primary NVIS filter sheet mounted on top of said reverse-mounted plurality of LEDs.

9. The multimode display of claim 1 wherein said dedicated primary IR filtering means further includes a NVIS filter light leak gasket.

10. The multimode display of claim 1 wherein said display assembly, comprises:
  a display frame chassis serving as a spacing and supporting element for said display subassembly.

11. The multimode display of claim 1 further including a backlight reflector positioned between said PWB assembly and said display subassembly.

12. The multimode display of claim 1 further including a backlight heatsink operatively positioned relative to said PWB assembly to dissipate heat therefrom.

13. The multimode display of claim 1 wherein said display component comprises a liquid crystal display (LCD) stack.

14. The multimode display of claim 1 wherein said display component comprises an active matrix liquid crystal display (AMLCD) stack.

15. The multimode display of claim 1 wherein said dedicated primary IR filtering means is partitioned into individual means specifically designed for optimal performance of each independent color being filtered.

16. A multimode display for night vision imaging system (NVIS) compatible operation, comprising:
  a) a display assembly including a display subassembly, said display subassembly comprising a display component; and
  b) a backlight printed wiring board (PWB) assembly positioned behind said display subassembly, comprising,
    i) a printed wiring board (PWB);
    ii) a top side mounted LED array mounted on a first side of said printed wiring board (PWB) comprising a top side plurality of LEDs including a top side set of white LEDs;
    iii) a reverse-mounted LED array mounted on a second side of said printed wiring board (PWB) comprising a reverse-mounted plurality of LEDs including a reverse-mounted set of white LEDs; and,
    iv) dedicated primary IR filtering means operatively associated with said reverse-mounted LED array for conditioning light emitted from said reverse-mounted LED array for NVIS compatible operation, wherein said dedicated primary IR filtering means further includes a NVIS filter light leak gasket,
  wherein in a day mode of operation said forward-side mounted LED array illuminates said display subassembly; and, in an NVIS mode of operation filtered light from said reverse-mounted LED array illuminates said display subassembly.

17. The multimode display of claim 16 wherein said top side plurality of LEDs further includes a top side set of red LEDs.

18. The multimode display of claim 16 wherein said reverse-mounted plurality of LEDs further includes a reverse-mounted set of red LEDs.

19. The multimode display of claim 16 wherein said top side plurality of LEDs further includes a top side set of green LEDs.

20. The multimode display of claim 16 wherein said top side plurality of LEDs further includes a top side set of blue LEDs.

21. The multimode display of claim 16 wherein said dedicated primary IR filtering means comprises a plurality of primary NVIS filters, each mounted on the top of an opening for one or more of said reverse-mounted LEDs.

22. The multimode display of claim 16 wherein said dedicated primary IR filtering means comprises a plurality of primary NVIS filters, each mounted in an opening directly on top of an associated one of said reverse-mounted LEDs in an opening of said PWB.

23. The multimode display of claim 16 wherein said dedicated primary IR filtering means comprises a primary NVIS filter sheet mounted on top of said reverse-mounted plurality of LEDs.

24. The multimode display of claim 16 further including a secondary IR filter positioned between said backlight printed wiring board (PWB) and said display subassembly.

25. The multimode display of claim 16 wherein said display assembly, comprises:
  a display frame chassis serving as a spacing and supporting element for said display subassembly.

26. The multimode display of claim 16 further including a backlight reflector positioned between said PWB assembly and said display subassembly.

27. The multimode display of claim 16 further including a backlight heatsink operatively positioned relative to said PWB assembly to dissipate heat therefrom.

28. The multimode display of claim 16 wherein said display component comprises a liquid crystal display (LCD) stack.

29. The multimode display of claim 16 wherein said display component comprises an active matrix liquid crystal display (AMLCD) stack.

30. The multimode display of claim 16 wherein said dedicated primary IR filtering means is partitioned into individual means specifically designed for optimal performance of each independent color being filtered.

* * * * *